(12) United States Patent
Eluru et al.

(10) Patent No.: US 10,767,102 B2
(45) Date of Patent: Sep. 8, 2020

(54) CLEAN GRAVEL PACK FLUID COMPOSITION AND METHOD FOR SAND CONTROL APPLICATIONS

(71) Applicant: HALLIBURTON ENERGY SERVICES, INC., Houston, TX (US)

(72) Inventors: Sairam Eluru, Pune (IN); Sunil Narasingrao Garaje, Pune (IN); Rajender Salla, Pune (IN)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 198 days.

(21) Appl. No.: 15/781,761

(22) PCT Filed: Jan. 28, 2016

(86) PCT No.: PCT/US2016/015397
§ 371 (c)(1),
(2) Date: Jun. 6, 2018

(87) PCT Pub. No.: WO2017/131704
PCT Pub. Date: Aug. 3, 2017

(65) Prior Publication Data
US 2018/0362830 A1  Dec. 20, 2018

(51) Int. Cl.
*E21B 43/04* (2006.01)
*C09K 8/575* (2006.01)
*C09K 8/508* (2006.01)
*C09K 8/514* (2006.01)

(52) U.S. Cl.
CPC .......... *C09K 8/5758* (2013.01); *C09K 8/508* (2013.01); *C09K 8/514* (2013.01); *C09K 8/575* (2013.01); *E21B 43/04* (2013.01); *C09K 2208/24* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 4,945,991 | A | 8/1990 | Jones |
| 5,062,484 | A | 11/1991 | Schroeder, Jr. et al. |
| 5,948,733 | A | 9/1999 | Cawiezel et al. |
| 9,016,375 | B2 | 4/2015 | Salgaonkar et al. |
| 2002/0055562 | A1 | 5/2002 | Butuc |
| 2005/0261138 | A1 | 11/2005 | Robb et al. |
| 2007/0173418 | A1 | 7/2007 | Munoz, Jr. et al. |

(Continued)

FOREIGN PATENT DOCUMENTS

WO  WO 2015153461 A1  10/2015

OTHER PUBLICATIONS

International Search Report and Written Opinion for International Application No. PCT/US2016/015397 dated Aug. 30, 2016. (9 pages).

*Primary Examiner* — Andrew Sue-Ako
(74) *Attorney, Agent, or Firm* — Haynes and Boone, LLP

(57) ABSTRACT

Methods and compositions for gravel packing a wellbore penetrating a subterranean formation are described. The methods include providing a gravel packing fluid and contacting the subterranean formation with the gravel packing fluid so as to place a gravel pack in or near a portion of the subterranean formation. The gravel packing fluid includes a particulate agent and hydroxypropyl starch phosphate.

20 Claims, 3 Drawing Sheets

400

402 — PROVIDE A GRAVEL PACKING FLUID INCLUDING A PARTICULATE AGENT AND HYDROXYPROPYL STARCH PHOSPHATE

404 — CONTACT THE SUBTERRANEAN FORMATION WITH THE GRAVEL PACKING FLUID SO AS TO PLACE A GRAVEL PACK IN OR NEAR A PORTION OF THE SUBTERRANEAN FORMATION

(56) References Cited

U.S. PATENT DOCUMENTS

| | | | |
|---|---|---|---|
| 2010/0270017 A1* | 10/2010 | Prasek | C09K 8/74 166/300 |
| 2010/0314109 A1 | 12/2010 | Garcia et al. | |
| 2011/0053807 A1 | 3/2011 | Panga et al. | |
| 2013/0324687 A1* | 12/2013 | Khosravi | C07C 69/96 526/264 |
| 2015/0344767 A1* | 12/2015 | Lei | C08B 11/20 507/224 |
| 2019/0127629 A1* | 5/2019 | Eluru | C09K 8/80 |
| 2019/0316024 A1* | 10/2019 | Prakash | C09K 8/80 |

\* cited by examiner

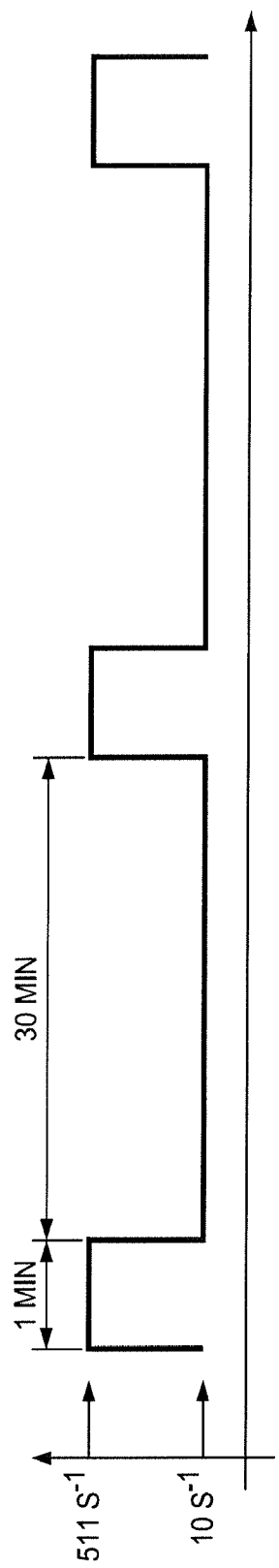
Fig. 2
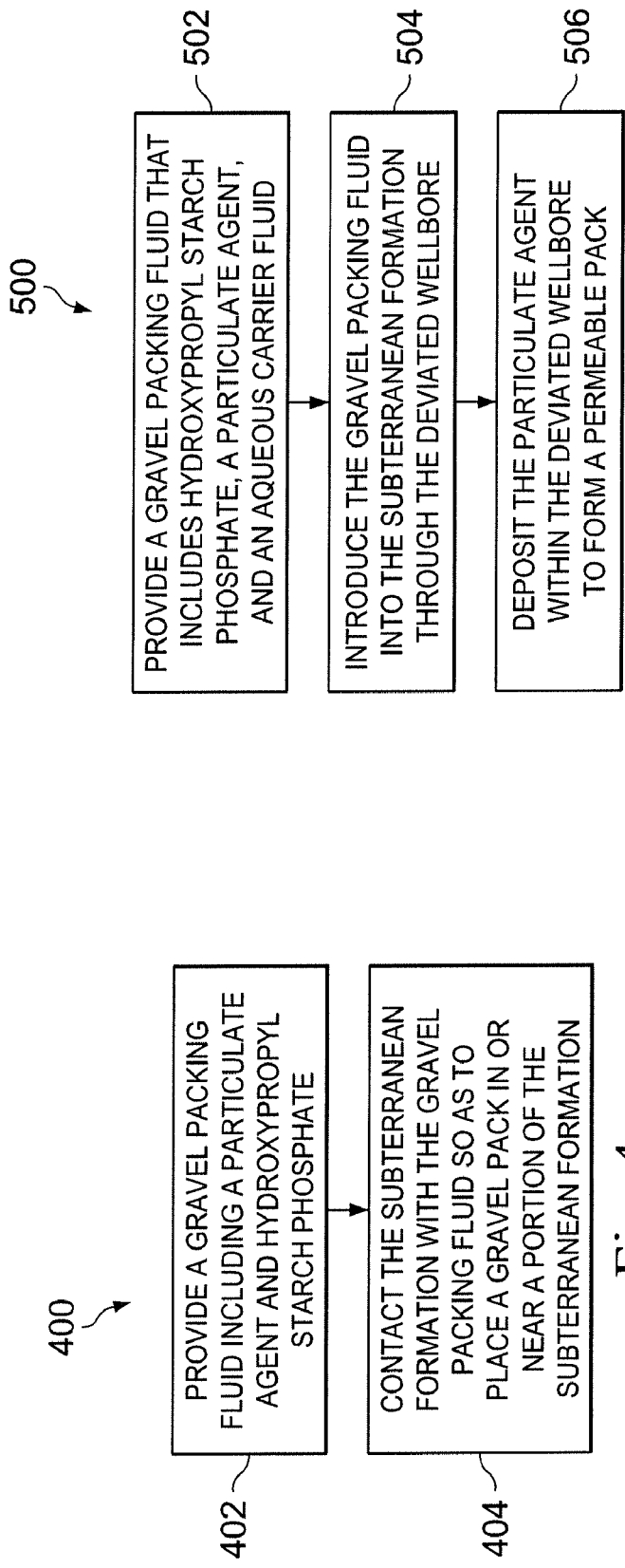

CLEAN GRAVEL PACK FLUID COMPOSITION AND METHOD FOR SAND CONTROL APPLICATIONS

CROSS-REFERENCE TO RELATED APPLICATION

The present application is a U.S. National Stage patent application of International Patent Application No. PCT/US2016/015397, filed on Jan. 28, 2016, the benefit of which is claimed and the disclosure of which is incorporated herein by reference in its entirety.

BACKGROUND

The present invention relates generally to a treatment fluid composition, and more particularly to a gravel packing fluid composition that includes hydroxypropyl starch phosphate.

Unconsolidated formations, particularly those containing loose sand and soft sandstone strata, present constant problems in well production due to migration of loose sand and degraded sandstone into the wellbore as the formation deteriorates under the pressure and flow of fluid through the wellbore. One method of controlling sand migration includes gravel packing.

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and other oilfield equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, the term "gravel" refers to relatively large particles in the sand size classification, that is, particles ranging in diameter from about 0.1 mm up to about 2 mm. Generally, gravel is selected for having properties of physical integrity and chemical stability. An example of a commonly used gravel packing material is sand having an appropriate particulate size range. In one common type of gravel packing, a mechanical screen is placed in the wellbore and the surrounding annulus is packed with a particulate of a larger specific size designed to prevent the passage of formation sand or other fines.

Conventional gravel packing fluids use viscosifiers that allow or permit the gravel to fall or settle before it is placed in the correct location in the wellbore. For example, uncrosslinked hydroxyethylcellulose, hydroxypropylguar, xanthan gum, diutan, and like permit the gravel to fall or settle to the low side of the tubing in long, highly deviated wells particularly when used with fluids containing high amount of brine (e.g., more than 10%).

Thus, there is a continuing need for improved methods and compositions for gravel packing.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

FIG. 2 is a graph of a shear rate cycle imposed on a gravel packing fluid according to embodiments of the present invention.

FIG. 4 depicts a method of gravel packing a wellbore penetrating a subterranean formation according to embodiments of the present invention.

FIG. 5 depicts a method of gravel packing a deviated wellbore penetrating a subterranean formation according to embodiments of the present invention.

DETAILED DESCRIPTION

Figure 1:
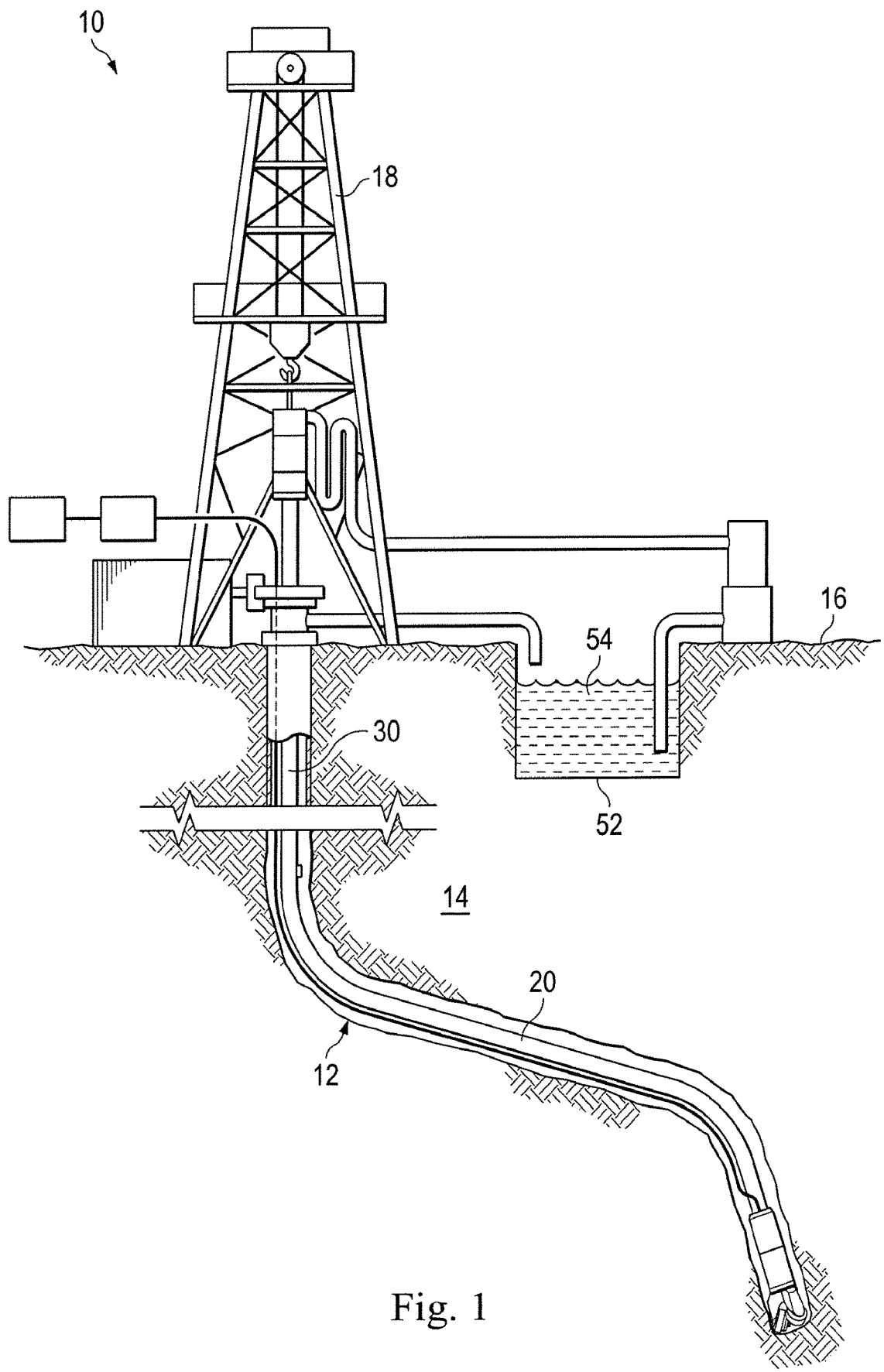
FIG. 1 illustrates a land-based drilling and production system.

According to several exemplary embodiments, compositions and methods are provided for placing a gravel pack in a wellbore of a subterranean formation. An ideal fluid for gravel packing would exhibit: (1) little or no settling of gravel so that a high concentration of gravel can be transported, (2) adequate fluid loss to ensure compact packing of the gravel against the formation face, and (3) breaking to a reduced viscosity similar to the viscosity of water after a certain amount of time and depositing no residual solids to avoid or minimize any formation damage.

According to several exemplary embodiments, the wellbore is a deviated wellbore. The term "deviated wellbore" as used herein means a wellbore in which any portion of the well is in excess of about 65 degrees from a vertical inclination.

Gravel packing of wells that are highly deviated (i.e., horizontally inclined) requires the use of a viscosified fluid that is capable of providing a zero rate of gravel settling in the fluid during placement in the wellbore. Gravel packing fluid having a zero gravel fall rate would assure that the gravel being carried to the production zone in a highly deviated wellbore would not prematurely settle out.

According to several exemplary embodiments, a method of gravel packing a wellbore penetrating a subterranean formation is provided. The method includes providing a gravel packing fluid including a particulate agent and hydroxypropyl starch phosphate, and contacting the subterranean formation with the gravel packing fluid so as to place a gravel pack in or near a portion of the subterranean formation. According to several exemplary embodiments, the hydroxypropyl starch phosphate is present in the gravel packing fluid in an amount of about 0.1 to 10 weight percent of the gravel packing fluid, such as about 0.5 to 6 weight percent of the gravel packing fluid or about 0.8 to 5 weight percent of the gravel packing fluid. According to several exemplary embodiments, the gravel packing fluid further includes an aqueous carrier fluid.

According to several exemplary embodiments, the method further includes reducing a viscosity of the gravel packing fluid. For example, the gravel packing fluid can further include a breaker, and the gravel packing fluid can be exposed to bottomhole temperatures of about 250° F. or less. In another example, the gravel packing fluid is exposed to bottomhole temperatures of at least about 300° F. According to several exemplary embodiments, reducing the viscosity of the gravel packing fluid further includes exposing the gravel packing fluid to shear cycles for about 1.5 to 3 hours.

According to several exemplary embodiments, the gravel packing fluid further includes a gel stabilizer. According to several exemplary embodiments, the wellbore includes a deviated wellbore.

According to several exemplary embodiments, a method of gravel packing a deviated wellbore penetrating a subterranean formation is provided. The method includes providing a gravel packing fluid that includes hydroxypropyl starch phosphate, a particulate agent, and an aqueous carrier fluid, introducing the gravel packing fluid into the subterranean formation through the deviated wellbore, and depositing the particulate agent within the deviated wellbore to form a permeable pack. According to several exemplary embodiments, the hydroxypropyl starch phosphate is present in the gravel packing fluid in an amount of about 0.1 to 10 weight percent of the gravel packing fluid, such as about 4 weight percent of the gravel packing fluid.

According to several exemplary embodiments, the method further includes reducing a viscosity of the gravel packing fluid. For example, the gravel packing fluid may further include a breaker, and the gravel packing fluid may be exposed to bottomhole temperatures of about 250° F. or less. In another example, the gravel packing fluid further includes a gel stabilizer and reducing the viscosity of the gravel packing fluid includes exposing the gravel packing fluid to bottomhole temperatures of at least about 300° F.

According to several exemplary embodiments, reducing the viscosity of the gravel packing fluid further includes exposing the gravel packing fluid to shear cycles for about 1.5 to 3 hours.

According to several exemplary embodiments, a gravel packing fluid is provided. The gravel packing fluid includes a bromide or chloride based aqueous brine carrier liquid, a particulate agent, and hydroxypropyl starch phosphate. According to several exemplary embodiments, the gravel packing fluid further includes a gel stabilizer. According to several exemplary embodiments, the gravel packing fluid further includes a breaker.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that can be pumped to the upper end of tubing string 30 from which the working fluid 54 can flow through tubing string 30. Working fluid source 52 may supply any fluid utilized in wellbore operations, including without limitation, drilling fluid, cementitious slurry, acidizing fluid, liquid water, steam, hydraulic fracturing fluid, propane, nitrogen, carbon dioxide or some other type of fluid.

The gravel packing fluids of the present invention include an aqueous carrier fluid and a gelling agent. The fluid can carry substantial quantities of gravel into a subterranean formation without premature settling and can be pumped into the formation utilizing pumping equipment and tubular goods normally available at a wellhead. Moreover, the gravel packing fluids of the present invention exhibit adequate fluid loss and breaking to a reduced viscosity over time. The gravel packing fluids exhibit very good thermal stability and are stable for at least 3 hours at 305° F.

According to several exemplary embodiments the gravel packing fluids and methods of the present invention use hydroxypropyl starch phosphate (commercially available under the name Structure® XL from AkzoNobel) as a gelling agent. Hydroxypropyl starch phosphate is a clean breakable polymer that is used as a food ingredient and in cosmetics as a biodegradable additive. Advantageously, the gelling agent works at temperatures of 300° F. and higher. The gelling agent works even at temperatures beyond 305° F.

According to several exemplary embodiments, the gravel packing fluids of the present invention include an aqueous carrier fluid. The aqueous carrier fluid generally includes fresh water, salt water, or a brine (e.g., a saturated salt water). Other water sources may be used, such as those including divalent or trivalent cations, e.g., magnesium, calcium, zinc, or iron. If a water source is used that contains such divalent or trivalent cations in concentrations sufficiently high to be problematic, then such divalent or trivalent salts may be removed, either by a process such as reverse osmosis, or by raising the pH of the water in order to precipitate out such divalent salts to reduce the concentration of such salts in the water before the water is used. Monovalent brines can be used and, where used, may be of any weight. Salts may be added to the water source to provide a brine to produce a treatment fluid having a desired density or other characteristics. One of ordinary skill in the art recognizes the particular type of salt appropriate for a particular application, given considerations such as protection of the formation, the presence or absence of reactive clays in the formation adjacent to the wellbore, and the factors affecting wellhead control. A wide variety of salts may be suitable. Salts of 1A and 2A group metal ions of the periodic table containing chloride, bromide, carboxylate counter ions and combination thereof may be used in the carrier fluid. Salts of tetra substituted ammonium salts containing chloride, bromide, and/or carboxylate counter ions are also suitable for use in the carrier fluid. Examples of suitable salts include potassium chloride, sodium chloride, lithium chloride, potassium bromide, sodium bromide, lithium bromide, ammonium chloride, cesium formate, potassium formate, sodium formate, sodium nitrate, calcium bromide, calcium chloride, zinc bromide, zinc chloride and sodium chloride. One of ordinary skill in the art recognizes the appropriate concentration of a particular salt to achieve a desired density given factors such as environmental regulations. Also, the composition of the water used also will dictate whether and what type of salt is appropriate.

Hydroxypropyl starch phosphate is admixed with the aqueous carrier fluid in an amount sufficient to provide a desired viscosity to the gravel packing fluid. Generally, the gelling agent is present in an amount of from about 0.1 to about 10 percent by weight of the gravel packing fluid. According to several exemplary embodiments, the gelling agent is present in an amount of about 0.5 to about 6 percent by weight of the gravel packing fluid. According to several exemplary embodiments, the gelling agent is present in an amount of about 0.8 to about 5 percent by weight of the gravel packing fluid. According to several exemplary embodiments, the gelling agent is present in an amount of about 4 percent by weight of the gravel packing fluid.

According to several exemplary embodiments, the gravel packing fluids of the present invention also may include pH control additives, iron sequestering agents, surfactants, breakers, bactericides, fluid loss control additives, gel stabilizers, combinations thereof, or the like. The gravel packing fluids of the present invention are compatible with Fe-6 iron reducing agent, all bactericides and all gel stabilizers.

Suitable pH control additives include bases, chelating agents, acids, or combinations of chelating agents and acids or bases. A pH control additive may be necessary to maintain the pH of the gravel packing fluids at a desired level, e.g., to improve the dispersion of the gelling agent in the aqueous carrier fluid.

According to several exemplary embodiments, the gravel packing fluids of the present invention may contain bactericides to protect both the subterranean formation as well as the gravel packing fluid from attack by bacteria. Such attacks may be problematic because they may lower the viscosity of the gravel packing fluid, resulting in poorer performance, such as poorer sand suspension properties, for example. Any bactericides known in the art are suitable. An artisan of ordinary skill is able to identify a suitable bactericide and the proper concentration of such bactericide for a given application. Where used, such bactericides are present in an amount sufficient to destroy all bacteria that may be present.

Examples of suitable bactericides include a 2,2-dibromo-3-nitrilopropionamide, commercially available under the tradename BE-3 STM Surfactant from Halliburton Energy Services, Inc., of Duncan, Okla., and a 2-bromo-2-nitro-1,3-propanediol commercially available under the tradename BE-6TM Surfactant from Halliburton Energy Services, Inc., of Duncan, Okla. In one embodiment, the bactericides are present in the gravel packing fluid in an amount in the range of from about 0.001% to about 0.003% by weight of the gravel packing fluid. Another example of a suitable bactericide is a solution of sodium hypochlorite, commercially available under the tradename CAT-1™ chemical from Halliburton Energy Services, Inc., of Duncan, Okla. In certain embodiments, such bactericides may be present in the gravel packing fluid in an amount in the range of from about 0.01% to about 0.1% by volume of the gravel packing fluid. In certain embodiments, when bactericides are used in the gravel packing fluids of the present invention, they are added to the gravel packing fluid before the gelling agent is added.

After a treatment fluid is placed where desired in the well and for the desired time, the fluid usually must be removed from the wellbore or the formation. For example, when a viscosified fluid is used for gravel packing, the viscosified fluid must be removed from the gravel pack. To accomplish this removal, the viscosity of the treatment fluid must be reduced to a very low viscosity, preferably near the viscosity of water, for optimal removal from the well.

Reducing the viscosity of a viscosified fluid is referred to as breaking the fluid. Chemicals used to reduce the viscosity of treatment fluids are called breakers.

According to several exemplary embodiments, the gravel packing fluids of the present invention also include breakers capable of reducing the viscosity of the gravel packing fluid at a desired time. According to several exemplary embodiments, a breaker is added to the gravel packing fluids when bottomhole temperatures in the wellbore are about 250° F. or below. Examples of such suitable breakers for the gravel packing fluids of the present invention include but are not limited to, sodium chlorite, hypochlorite, perborate, persulfates, and peroxides, including organic peroxides. Other suitable breakers include suitable acids.

At bottomhole temperatures below about 140° F., enzymes are generally used as breakers. Suitable enzymes for such use are alpha and beta amylases, amyloglucosidase, oligoglucosidase, invertase, maltase, cellulase and hemicellulase. A breaker may be included in the gravel packing fluids of the present invention in an amount and form sufficient to achieve the desired viscosity reduction at a desired time. The breaker may be formulated to provide a delayed break, if desired. The gravel packing fluids of the present invention are easily breakable even at low temperatures in the presence of a breaker.

Advantageously, breakers are not required at bottomhole temperatures of 300° F. and above. The gravel packing fluids are degradable at high temperatures and break down automatically after several shear cycles without the need for a breaker. According to several exemplary embodiments, the gravel packing fluids break down after about 1.5 to 3 hours. Without being bound by theory, it is believed that at these temperatures, the phosphate in the hydroxypropyl starch phosphate is released and acts as an acid to degrade the rest of the polymer.

According to several exemplary embodiments, if desired, gel stabilizers may be added to the gravel packing fluids of the present invention in high temperature (e.g., 300° F. and above) gravel packing operations. Suitable gel stabilizers include sodium thiosulfate, sodium gluconate, ascorbic acid, sodium glucoheptonate, diethanolamine, triethanolamine, methanol, hydroxyethyl glycine, tetraethylenepentamine, ethylenediamine, and combinations thereof. Such gel stabilizers may be useful when the gravel packing fluids of the present invention are utilized in a subterranean formation having a temperature above about 305° F. According to several exemplary embodiments, the gel stabilizer is present in the gravel packing fluid in an amount of about 0.1 to about 0.7 weight percent.

Any of a variety of conventional particulate agents may be employed with the gravel packing fluid compositions of the present invention such as quartz sand grains, glass beads, synthetic resins, resin coated sand, walnut shell fragments, nylon pellets and similar materials. Such agents are generally used in concentrations between about 1 to about 20 pounds per gallon of the gravel packing fluid, but higher or lower concentrations may be used as required. The size of particulate agent employed depends on the particular type of formation and the particle size of formation particulates and the like. Particles having a size in the range of from about 8 to about 70 mesh on the U.S. Sieve Series scale generally may be employed.

According to several exemplary embodiments, a method of gravel packing a wellbore penetrating a subterranean formation is provided. Turning now to FIG. 4, the method 400 includes providing a gravel packing fluid including a particulate agent and hydroxypropyl starch phosphate in step 402 and contacting the subterranean formation with the gravel packing fluid so as to place a gravel pack in or near a portion of the subterranean formation in step 404.

According to several exemplary embodiments, a method of gravel packing a deviated wellbore penetrating a subterranean formation is provided. Turning now to FIG. 5, the method 500 includes providing a gravel packing fluid that includes hydroxypropyl starch phosphate, a particulate agent, and an aqueous carrier fluid in step 502, introducing the gravel packing fluid into the subterranean formation through the deviated wellbore in step 504, and depositing the particulate agent within the deviated wellbore to form a permeable pack in step 506.

The gravel packing fluids of the present invention may be introduced into a formation in a variety of ways. Generally, a minor amount of the formation adjacent that section of the well to be treated is removed by washing with hot water as in the case of a tar sand formation or other suitable fluid or by underreaming to form a small cavity in the immediate vicinity of the wellbore. After a suitable amount of material has been removed, the tubing string or other well hardware is placed in the well following which the particulate material is introduced into the wellbore opposite the permeable formation.

In one method of introducing the particulate into the well, a gravel packing fluid containing the particulate agent is formed and pumped into the well bore. Generally, the thus-formed slurry is pumped down the annulus between the well tubing and the well casing, through the bottom of the annulus and then through perforations such as slots or other openings in the closed-end tubing which extends below the casing to a location opposite the permeable zone. The perforations in the tubing are selected so that the particulate material is filtered from the slurry as it enters the tubing from which the carrier liquid is removed to the surface by pumping. Simultaneously, the slurry is forced into the formation and the particulate material contained is filtered out against the formation face. The remaining gravel packing fluid in the wellbore, upon placement of the desired quantity of gravel, is permitted to break to a low viscosity fluid. The particulate agent remaining suspended in the fluid now separates and settles to form a pack having a minimum of void spaces. Normally, once the gravel packing fluid has broken, pumping of the fluid is resumed in the wellbore to further compact or settle the gravel pack to further minimize void spaces that may be present. The granular or particulate materials thus removed from the slurry form a pack consisting essentially of particulate which is tightly packed together to form a permeable sand control pack.

In another method, the casing which extends through the permeable production zone is perforated near the top and again near the bottom of the producing zone after which a tubing string equipped with a back-off connection so that the tubing can be pulled after packing and having a screen or perforated liner attached to it at the end is run and the screen or liner is positioned opposite the lower set of perforations. Then a packer is set between the two sets of perforations. Gravel packing fluid containing the particulate agent is pumped down the annulus between the casing and the tubing out of the upper set of perforations, through the previously formed cavity outside the casing opposite the perforations then back through the lower set of perforations and finally through the screen. The particulate agent is filtered out against the lower set of perforations and against the formation face from the portion of the slurry, which is simultaneously forced into the formation.

In yet another method for forming a pack, which is especially useful in connection with the production of heavy hydrocarbons from, for example, tar sands in which a heavy oil or tar is the matrix and sand or other solids are suspended in the oil, the casing is set through the production zone and perforated at the top of and at the bottom following which tubing is run into the casing to a depth so that a packer may be set between the sets of perforation and the tail pipe extended below the lowest perforations. After the packer is set, steam or hot water is forced down the casing, out of the upper perforations, back through the lower perforations and finally out of the tubing. Circulation is continued until a cavity of the desired size is washed or melted out of the formation. In the next step, the tubing and packer are pulled and tubing equipped with a back-off connection, so that the tubing can be pulled after packing and having a packed off screen at the end thereof, is run and set with the screen opposite the lower perforations and a packer between the two sets of perforations. The gravel packing fluid then is pumped down the annulus between the casing and tubing, out through the upper casing perforations and then back through the lower casing perforations and against the screen wall which filters out the particulate material while the carrying fluid passes through the screen and flows back to the surface via the tubing string. As the particulate material is filtered out, it gradually builds up in the cavity previously formed and when the amount of filtered out material is sufficient to cover the lower perforations the introduction of the slurry is stopped. Simultaneously during the injection phase, the slurry is forced out into the formation and particulate material thus is filtered out against the formation face and also contributes to the filling of the previously formed cavity.

The following examples are illustrative of the compositions and methods discussed above and are not intended to be limiting.

Example 1

Gravel Packing Fluid Without Gel Stabilizer

To prepare a gravel packing fluid, 4 grams of hydroxypropyl starch phosphate was dissolved in a 9.2 ppg sodium bromide aqueous solution (~16% NaBr). Carbolite proppant was added to the gravel packing fluid and mixed thoroughly, followed by heating the mixture up to 280° F. No proppant settling was observed.

Example 2

Gravel Packing Fluid with Gel Stabilizer

FDP-S1081-13 gel stabilizer (commercially available from Halliburton Energy Services, Inc.) was added to the gravel packing fluid of Example 1 so that the gel stabilizer was present in the gravel packing fluid in an amount of about 0.5 weight percent. Carbolite proppant was added, mixed thoroughly, and heated up to 305° F. No proppant settling was observed.

Example 3

To illustrate the stability of the gravel packing fluid of Example 2, the following rheological tests were performed to mimic shear cycles downhole.

FIG. 2 illustrates the shear cycle imposed on the gravel packing fluid of Example 2. The vertical axis corresponds to the shear rate and the horizontal axis corresponds to the time in minutes that the gravel packing fluid experiences the shear rate. The gravel packing fluid experiences a shear rate of 511/s for 1 minute and then a shear rate of 10/s for 30 minutes.

Figure 3:
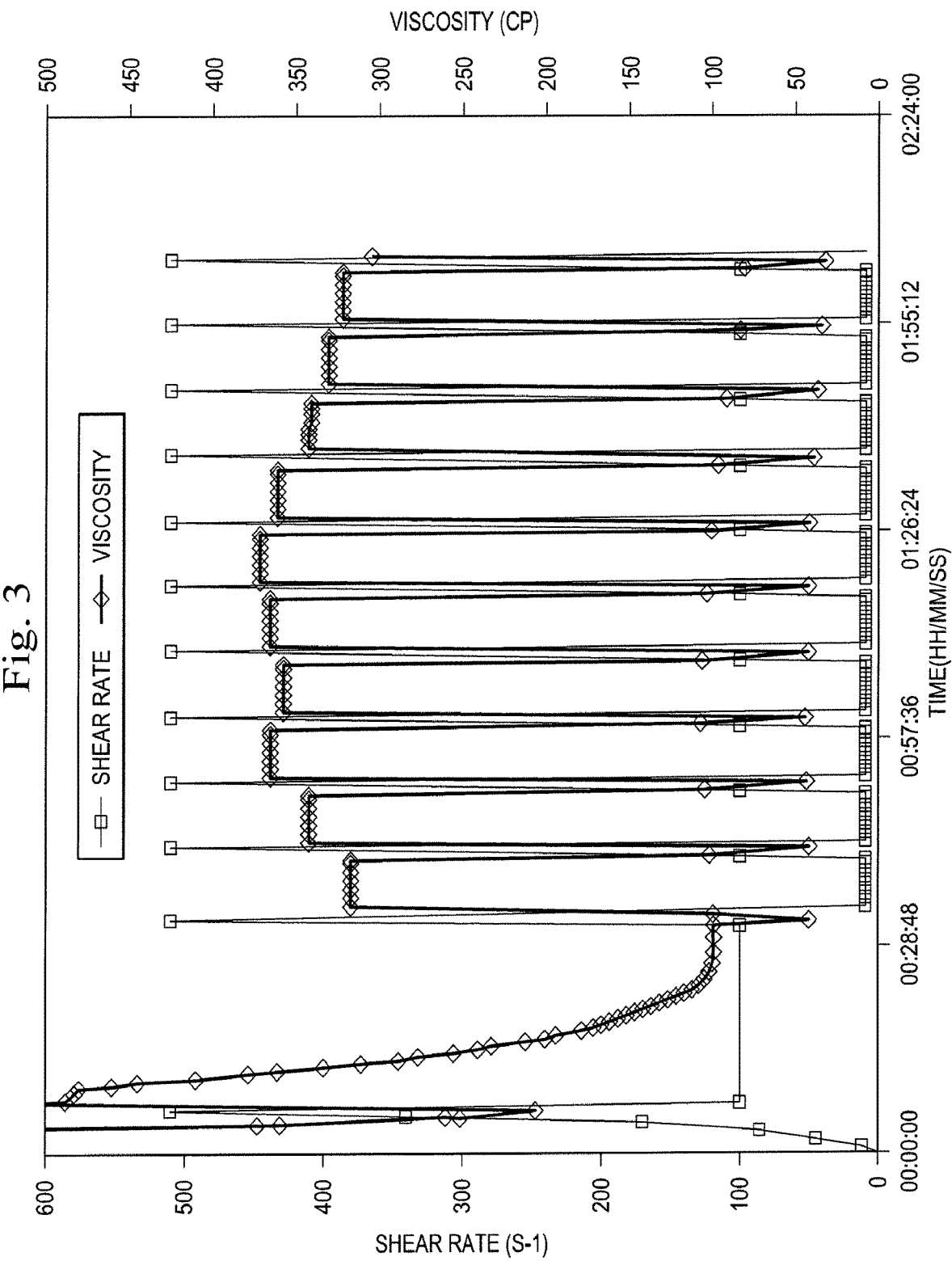
FIG. 3 is a viscosity and shear rate plot with time according to the shear rate cycle of FIG. 2 according to embodiments of the present invention.

FIG. 3 is a viscosity and shear rate graph with time according to the shear cycle of FIG. 2. As can be seen from the graph, the gravel packing fluid with gel stabilizer has a stable viscosity of 40 cp for at least 2 hours at 551/s after many shear cycles. After many shear cycles, the gravel packing fluid breaks down automatically without any breaker.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of gravel packing a wellbore penetrating a subterranean formation comprising:
   providing a gravel packing fluid comprising a particulate agent and hydroxypropyl starch phosphate, wherein the hydroxypropyl starch phosphate is present in the gravel packing fluid in an amount of about 0.1 to 10 weight percent of the gravel packing fluid; and
   contacting the subterranean formation with the gravel packing fluid so as to place a gravel pack in or near a portion of the subterranean formation.

2. The method of claim 1, wherein the hydroxypropyl starch phosphate is present in the gravel packing fluid in an amount of about 0.5 to 6 weight percent of the gravel packing fluid.

3. The method of claim 2, wherein the hydroxypropyl starch phosphate is present in the gravel packing fluid in an amount of about 0.8 to 5 weight percent of the gravel packing fluid.

4. The method of claim 1, wherein the hydroxypropyl starch phosphate is present in the gravel packing fluid in an amount of about 4 weight percent of the gravel packing fluid.

5. The method of claim 1, wherein the gravel packing fluid further comprises an aqueous carrier fluid.

6. The method of claim 5, wherein the aqueous carrier fluid comprises a bromide-based or a chloride-based aqueous brine carrier liquid.

7. The method of claim 1, further comprising reducing a viscosity of the gravel packing fluid.

8. The method of claim 7, wherein the gravel packing fluid further comprises a breaker, and the gravel packing fluid is exposed to bottomhole temperatures of about 250° F. or less.

9. The method of claim 7, wherein reducing the viscosity of the gravel packing fluid comprises exposing the gravel packing fluid to bottomhole temperatures of from about 300° F. to about 305° F.

10. The method of claim 9, wherein the gravel packing fluid further comprises a gel stabilizer.

11. The method of claim 1, wherein the wellbore comprises a deviated wellbore.

12. The method of claim 1, wherein the particulate agent comprises sand.

13. A method of gravel packing a deviated wellbore penetrating a subterranean formation comprising:
   providing a gravel packing fluid that comprises hydroxypropyl starch phosphate, a particulate agent, and an aqueous carrier fluid, wherein the hydroxypropyl starch phosphate is present in the gravel packing fluid in an amount of about 0.1 to 10 weight percent of the gravel packing fluid;
   introducing the gravel packing fluid into the subterranean formation through the deviated wellbore; and
   depositing the particulate agent within the deviated wellbore to form a permeable pack.

14. The method of claim 13, wherein the hydroxypropyl starch phosphate is present in the gravel packing fluid in an amount of about 4 weight percent of the gravel packing fluid.

15. The method of claim 13, wherein the hydroxypropyl starch phosphate is present in the gravel packing fluid in an amount of about 0.5 to 6 weight percent of the gravel packing fluid.

16. The method of claim 13, further comprising reducing a viscosity of the gravel packing fluid.

17. The method of claim 16, wherein the gravel packing fluid further comprises a breaker, and the gravel packing fluid is exposed to bottomhole temperatures of about 250° F. or less.

18. The method of claim 16, wherein the gravel packing fluid further comprises a gel stabilizer and reducing the viscosity of the gravel packing fluid comprises exposing the gravel packing fluid to bottomhole temperatures of from about 300° F. to about 305° F.

19. The method of claim 13, wherein the aqueous carrier fluid comprises a bromide-based or a chloride-based aqueous brine carrier liquid.

20. The method of claim 13, wherein the particulate agent comprises sand.

* * * * *